Feb. 21, 1950     L. A. PARADISE ET AL     2,498,093
CORN HARVESTER

Filed April 13, 1944                                      3 Sheets-Sheet 1

INVENTORS
LOUIS A. PARADISE
WILBUR J. COULTAS
NORMAN F. ANDREWS

ATTORNEYS

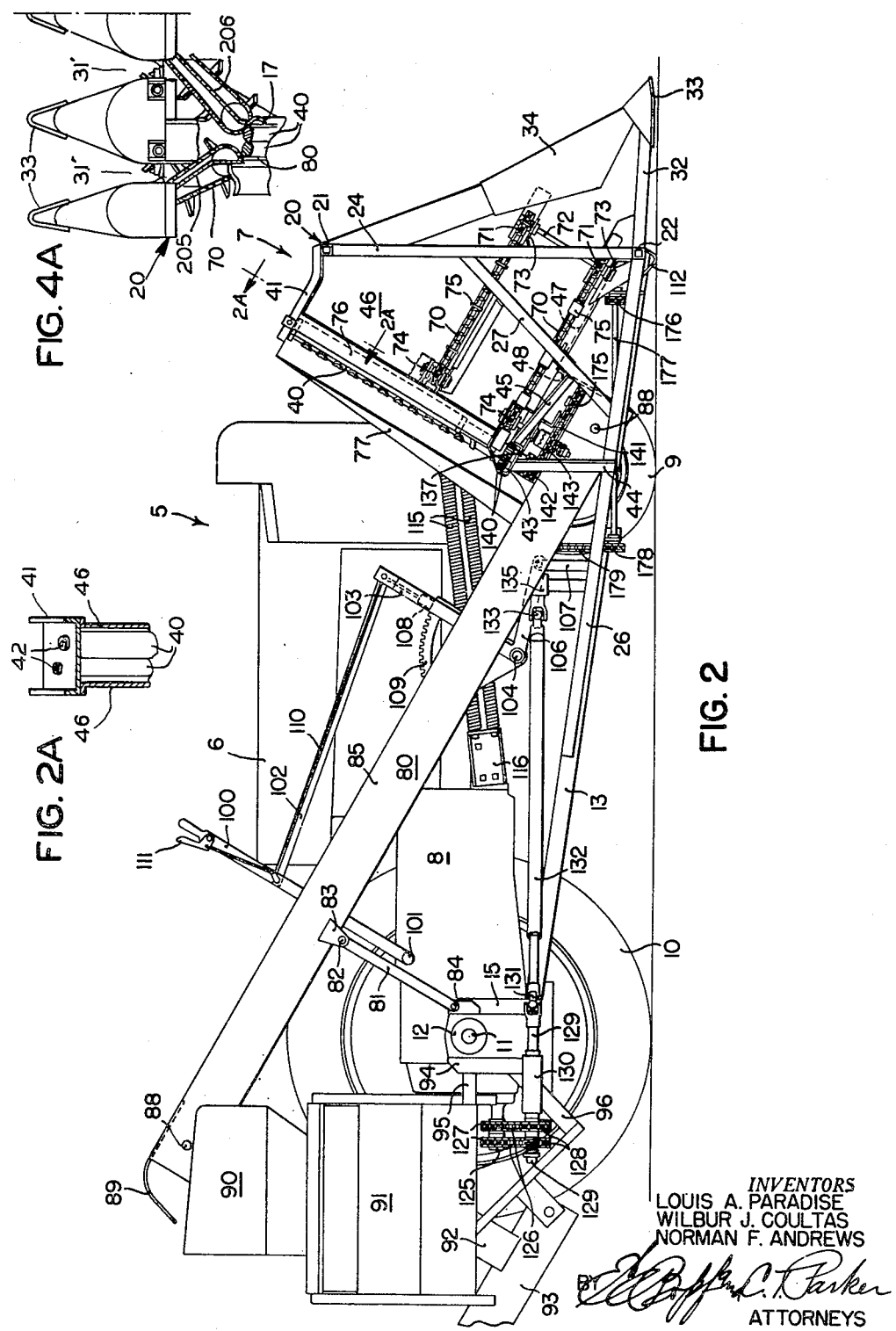

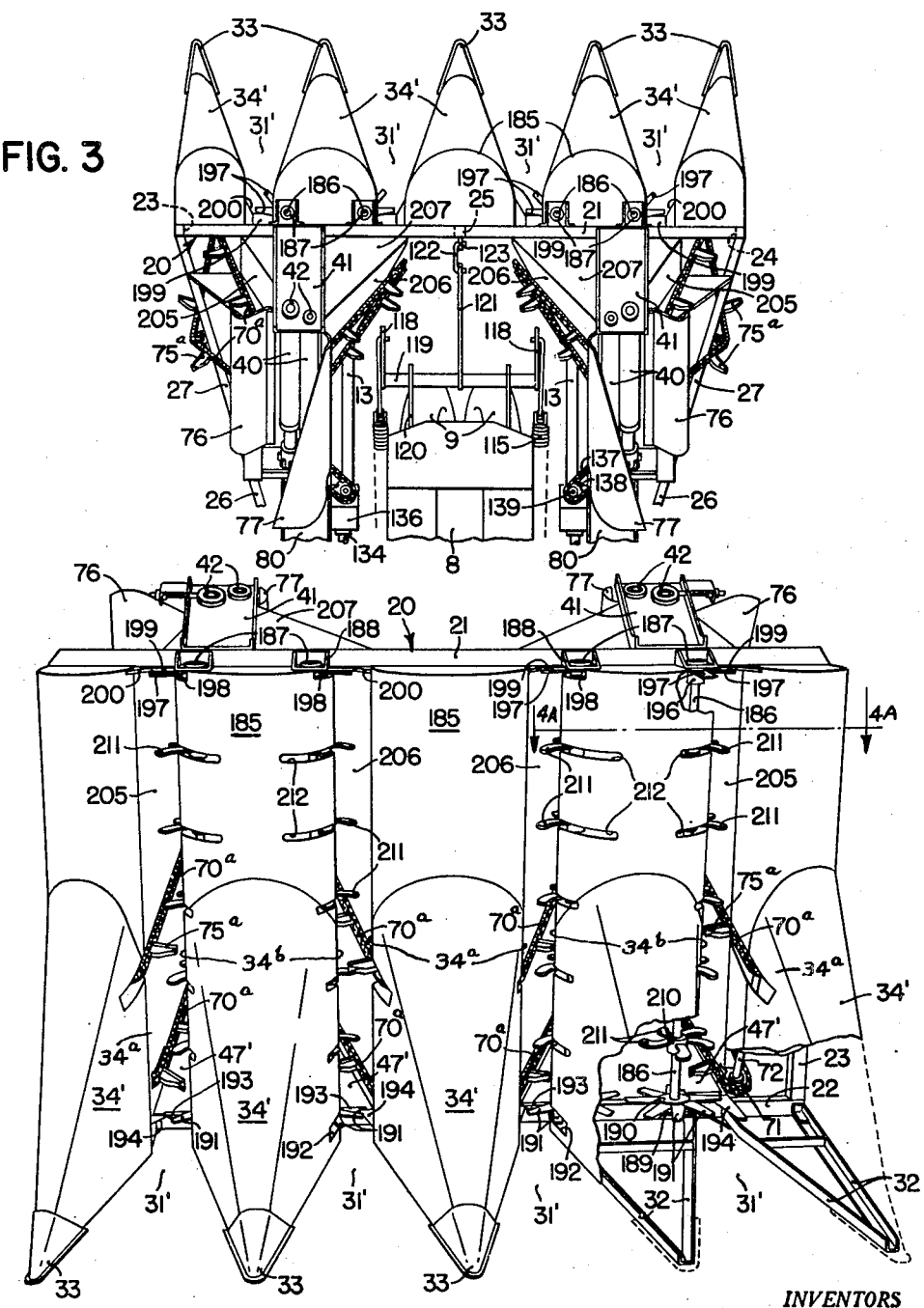

Patented Feb. 21, 1950

2,498,093

UNITED STATES PATENT OFFICE 2,498,093

CORN HARVESTER

Louis A. Paradise, Wilbur J. Coultas, and Norman F. Andrews, Moline, Ill., assignors to Deere & Company, Moline, Ill., a corporation of Illinois Application April 13, 1944, Serial No. 530,900

11 Claims. (Cl. 56—18)

The present invention relates generally to corn harvesters and more particularly to corn harvesters of the type which are mounted upon a tractor, and the principal object of this invention relates to the provision of a novel and improved tractor mounted corn harvester. A further object has to do with the provision of a corn harvester which serves the stalks from the field and passes them into an enclosed part of the machine, where they are presented to the snapping rolls and the ears are then snapped off and the stalks discharged upon the ground, any kernels which are shelled from the ears during the snapping operation being retained with the ears instead of being dropped on the ground.

A further object of our invention relates to the provision of a novel and improved means for mounting corn harvesting equipment on a tractor. In the accomplishment of this object, the gatherers are mounted on a transverse rectangular frame which is disposed across the front of the tractor in a generally vertical plane, the gatherers being supported between the top and bottom frame members of the rectangular frame and extending forwardly therefrom. The snapping rolls are positioned behind the frame and are inclined rearwardly and downwardly in order to grasp the upper ends of the stalks after they are severed from the ground. Enclosed passages are provided between the gatherers and the snapping rolls, through which the severed stalks are conveyed to the snapping rolls. The transverse frame is carried on the forward ends of a pair of push bars, which are pivotally connected at their rear ends to the tractor and which extend forwardly along opposite sides thereof, respectively.

Still another object relates to the provision of ear conveyors, which extend from a location beneath the snapping rolls, upwardly and rearwardly along opposite sides of the tractor and mounted on the longitudinal push bars, respectively.

Still another object relates to the provision for mounting either a two-row picker for forty to forty-two inch rows, or a four-row picker for twenty inch rows, selectively, on a common framework and with two pairs of snapping rolls in either case.

A still further object relates to the provision of crop treating mechanism associated with the harvesting mechanism and mounted on the tractor in a position to receive ears from the snapping rolls by way of the rearwardly inclined conveyors, the treating mechanism being either a corn sheller or a corn husker, as desired.

These and other objects and advantages of our invention will be apparent to those skilled in the art after a consideration of the following description, in which reference is had to the drawings appended hereto, in which Figure 1 is a plan view of a corn harvester embodying the principles of the present invention, a two-row harvester being shown in this embodiment.

Figure 2 is a side elevational view of the harvester shown in Figure 1.

Figure 2A is a fragmentary sectional view taken substantially along the line 2A—2A of Figure 2.

Figure 3 is a plan view of the forward end of a four-row corn harvester embodying the principles of the present invention.

Figure 4 is a front view drawn in perspective and to a larger scale, showing the four-row harvester.

Figure 4A is a fragmentary sectional view taken substantially along the line 4A—4A of Figure 4.

Figure 1:
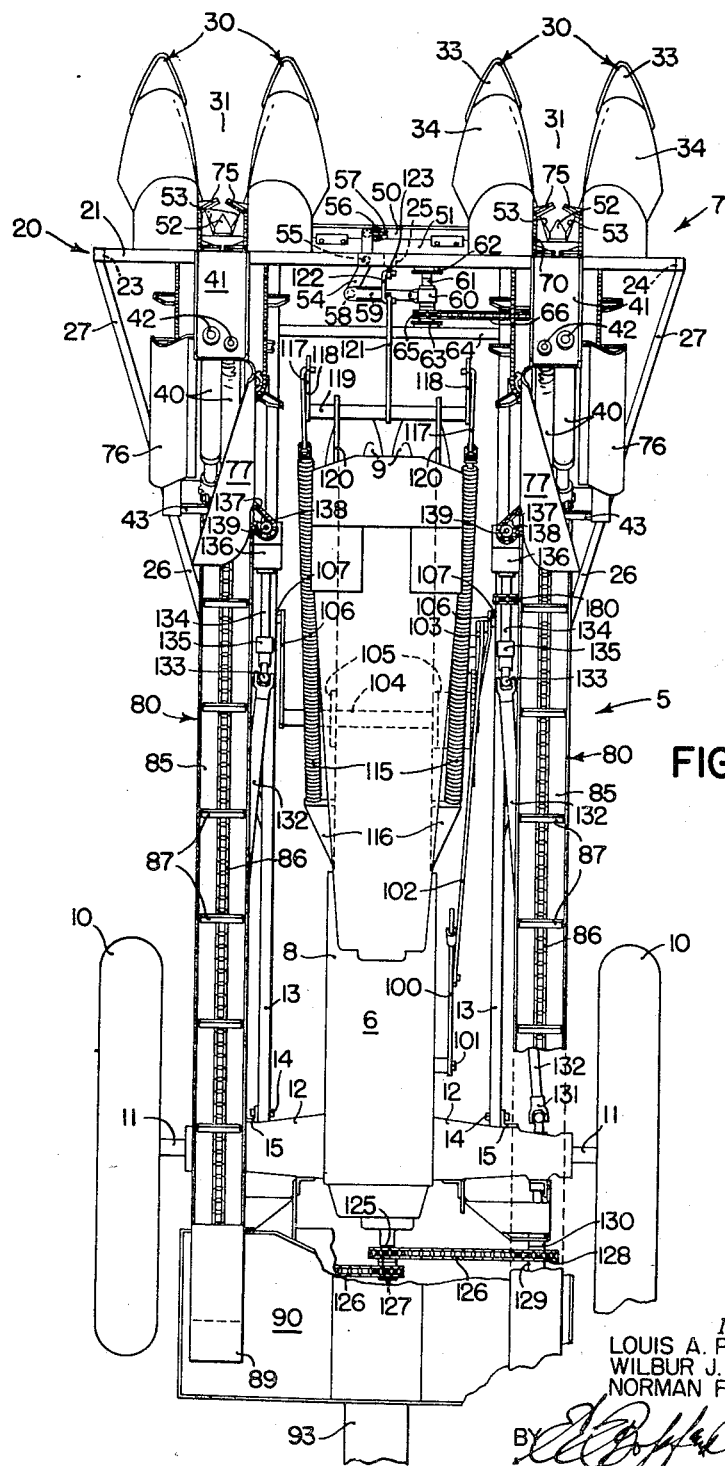

Referring now to the drawings and more particularly to Figures 1, 2 and 2A, the corn harvester is indicated in its entirety by reference numeral 5 and comprises a tractor 6 of a conventional type, and a two-row corn picker indicated in its entirety by reference numeral 7, mounted on the tractor 6. The tractor 6 is of the well-known tricycle type and comprises a narrow longitudinally extending body 8 carried on a pair of closely spaced dirigible front wheels 9 and a pair of comparatively widely spaced rear traction wheels 10. The wheels 10 are carried on axles 11 which are journaled in a pair of oppositely extending rear axle housings 12.

A pair of laterally spaced longitudinally extending push bars 13 are pivotally supported on transversely aligned pivot bolts 14, on a pair of vertically disposed supporting brackets 15 in the form of angle bars which are rigidly attached to the front sides of the tractor axle housings 12, respectively. The push bars extend forwardly from the bolts 14 along opposite sides of the tractor body 8 and are swingable vertically about the transverse axis of the bolts 14.

At the forward ends of the push bars 13 is mounted a transverse rectangular frame 20, disposed in a generally vertical plane across the front of the tractor 6. The frame 20 comprises a pair of upper and lower transverse frame members 21, 22, preferably in the form of rectangular tubing, spaced apart vertically and interconnected by a pair of generally vertical frame members, 23, 24, at the ends of the transverse frame members 21, 22. A third vertical frame member 25 is disposed at the center of the frame 20 and extends between the midpoints of the transverse frame members 21, 22. The push bars 13 are rigidly connected to the lower transverse frame member 22, so that the rectangular frame extends entirely above the push bars. As shown in Figure 1, the push bars are attached to the rectangular frame 20 at points spaced inwardly from the sides of the frame, the latter extending outwardly therefrom and terminating substantially at the fore and aft extending planes of the outsides of the traction wheels 10. The sides of the frame 20 are connected to the push bars 13 by bracing members 26, which are rigidly attached, as by welding, to the lower transverse frame member 22 adjacent the outer ends of the latter, respectively, and which converge rearwardly and inwardly and are rigidly attached at their rear ends to the sides of the push bars 13, respectively. Thus, the braces 26 lie approximately in the same plane with the push bars 13. Other bracing members 27 are fixed to the intermediate parts of the vertical frame members 23, 24 and incline downwardly and rearwardly and also converge inwardly and are fixed at their lower ends to the converging brace members 26.

Extending forwardly from the frame 20 are two pairs of gatherers 30, each pair being spaced apart laterally to define stalk receiving passages 31. The two pairs of gatherers are spaced apart on opposite sides of the frame 20 so that the transverse distance between the center lines of the passages 31 is equal to the spacing between rows of corn, which is normally on the order of forty to forty-two inches. Each of the gatherers 30 comprises a forwardly extending frame 32 consisting of a pair of forwardly converging structural members connected rigidly at their rear ends with the lower transverse frame member 22 and interconnected at their front ends to support the gatherer point or shoe 33. A sheet metal stalk lifting and guiding member 34 extends upwardly from the frame 32 to form the side wall of the stalk receiving passage 31 and curves outwardly from the passage 31 to form a rounded ridge portion which inclines upwardly and rearwardly from the shoe 33 and which is rigidly attached at its upper end to the upper transverse frame member 21.

Disposed behind each pair of gatherers 30 in alignment with the stalk receiving passage 31 is a pair of snapping rolls 40. Each pair of rolls 40 is supported at its upper ends in a channel shaped supporting member 41 which is fixed at its forward end to the upper transverse frame member 21 and which extends rearwardly and upwardly therefrom. Shaft bearings 42 for the upper ends of the rolls 40 are mounted on the channel shaped member 41 adjacent the rear end thereof. The lower ends of each pair of snapping rolls are journaled in bearings carried on a transverse channel member 43, which is rigidly supported on laterally spaced vertical legs 44 and forwardly inclined legs 45, which are rigidly fixed to the frame members 26, 27, respectively. By this means, the snapping rolls 40 are positioned in elevated relation above the push bars 13 and bracing members 26, behind the rectangular frame 20, with the upper ends of the rolls supported on the upper frame member 21 and extending downwardly and rearwardly in an inclined position.

A pair of vertical side sheets 46 extend downwardly from the opposite edges of each channel member 41 (Fig. 2A) and extend from the rectangular frame 20 rearwardly to the snapping rolls 40 to provide a rearwardly extending stalk receiving passage in alignment with the passage 31 between the gatherers 30, through which the stalks are conveyed from the gatherers to the snapping rolls 40. The channel member 41 serves as the top enclosure for this passageway and a floor plate or butt pan 47 extends upwardly and rearwardly between the walls 46 from the lower frame member 22 and terminates along an edge 48 (see Figure 2), which is spaced appreciably ahead of the lower end of the snapping roll 40, leaving an opening between the edge 48 and the rolls through which the snapped ears of corn may fall. The pressure of corn continuously moving rearwardly in the stalk passage, plus the action of the gathering chains, insures that snapped ears will fall over the rear edge of the butt pan into conveyors to be presently described.

A sickle 50 is slidably mounted on a transverse cutter bar 51, which is secured to the lower transverse frame member 22 immediately ahead of the latter. The sickle 50 is provided with a sickle knife blade 52 at each end thereof, each of which cooperates with a pair of stationary knife blades 53 fixed to the cutter bar 51 on opposite sides of the associated stalk receiving passage 31 between the gatherers 30. The sickle knife blade 52 is reciprocated transversely of the passage 31 to cooperate with the stationary knife blades 53 for severing the stalks in each of the two rows of corn as the latter is received within the stalk receiving passages 31. The sickle 50 is reciprocated over the cutter bar 51 by means of a bell crank 54 pivotally mounted on a pivot pin 55 extending vertically from the lower transverse frame member 22. The forward end of the bell crank 54 is connected by a link 56 through a ball and socket joint 57 to the sickle 50, while the rear end of the bell crank 54 is connected through a flexible joint 58 to a pitman 59, which is provided with a pitman bearing 60 journaled on the crank of a crankshaft 61. The crankshaft 61 extends fore and aft between a bearing 62 mounted on the lower transverse frame member 22 and a bearing 63 mounted on a transverse frame member 64 spaced rearwardly from the lower transverse frame member 22 and fixed at opposite ends thereof to the two push bars 13. A drive sprocket 65 is mounted on the crankshaft 61 and is connected through a drive chain 66 to a suitable power shaft, as will be described later.

Stalks severed by the knives 52, 53 are conveyed rearwardly through the stalk passage between the walls 46 by means of gatherer chains 70 spaced vertically one above the other and trained over sprockets 71 fixed to a forwardly and upwardly inclined shaft 72 journaled on brackets 73 which are mounted on the rectangular frame 20. A pair of vertically spaced gatherer chains 70 is provided on each wall 46 of each of the two stalk receiving passages. Each of the chains 70 extends upwardly and rearwardly and is trained over a sprocket 74 at the rear of the passage. The chains 70 are provided with stalk engaging fingers or lugs 75 and the inner flights of the chains within the stalk passages move rearwardly so that the lugs 75 engage the stalks to move the latter rearwardly through the passage and thus present the stalks top end first to the snapping rolls 40.

As the stalks are drawn through between the snapping rolls 40, they are discharged laterally outwardly by means of a pair of curved guide sheets 76, 77, which are fixed along one edge to the rear edges of the side walls 46 and substantially parallel to the snapping rolls 40. The outer guide sheet 76 for each pair of rolls curves laterally outwardly and serves as an apron over which the stalks are discharged, while the inner guide sheets 77 curve upwardly and outwardly in spaced relation to the snapping rolls to turn the stalks outwardly as they are discharged from the rolls.

As stated above, the ears of corn are snapped from the stalks as the latter pass through the snapping rolls, the ears falling beneath the inclined rolls and behind the rear edges 48 of the butt pans 47 into the lower ends of a pair of ear conveyors 80, which are inclined upwardly and rearwardly from a position beneath the rear edges 48 of the butt pans 47, beneath the snapping rolls 40, and which extend along opposite sides of the tractor body 6, respectively, over the laterally extending axle housings 12 to an elevated position behind the tractor. The forward ends of the conveyors 80 are mounted on the push bars 13, while the rear ends of the conveyors 80 are supported on the axle housings 12 by means of supporting links 81, which are pivotally connected by pivot pins 82 to ears 83 welded to the intermediate portions of the conveyors 80. The lower ends of the links 81 are pivoted at 84 to the brackets 15 and are fixed to the front sides of the axle housings 12.

Each of the conveyors 80 comprises a sheet metal trough 85 within which is movably disposed an endless chain 86 having a plurality of longitudinally spaced paddles 87 attached thereto. The chains 86 are trained over upper and lower sprockets (not shown) mounted on shafts 88, which are journaled in the sides of the trough 85 at opposite ends thereof, respectively. A hood 89 is curved downwardly over the upper end of the trough 85 to deflect the ears of corn as they are discharged from the latter, downwardly into a hopper 90, which is mounted on top of and discharges into a housing 91 at the rear of the tractor.

Within the housing 91 is any suitable crop treating mechanism, such as husking mechanism or shelling mechanism, which forms no part of the present invention and therefore is not shown in the drawings. The treated corn, consisting either of the shelled kernels or the husked ears, is discharged downwardly through a chute 92 into a wagon elevator 93 which conveys the corn to a wagon or truck behind the tractor, in a manner well-known to those skilled in the art. The housing 91 is supported on an angle iron bracket 94 fixed to the rear sides of the axle housings 12 and connected to the housing 91 by frame members 95, 96.

The push bars 13 are raised and lowered to adjust the forward ends of the gatherers 30 relative to the ground, by means of a hand lever 100 pivotally connected to the side of the tractor by means of a pivot pin 101 for swinging movement in a fore and aft extending vertical plane. The hand lever 100 is connected by means of a forwardly extending link 102 to a lever arm 103 mounted on a transverse rockshaft 104, which is journaled in a pair of supporting plates 105 attached to the sides of the tractor body, respectively. The rockshaft 104 extends beneath the body and is provided at opposite ends thereof, respectively, with a pair of lifting arms 106 which extend forwardly from the rockshaft. The forward ends of the lifting arms 106 are connected through depending links 107 to the push bars 13. A latch device 108 mounted on the lever arm 103 engages a notched sector 109 fixed to the side of the tractor and is actuated through suitable linkage 110 connected to a latch lever 111 mounted on the hand lever 100, for the purpose of securing the rockshaft in adjusted position, as is well known to those skilled in the art. Thus, the operator, by pulling rearwardly on the hand lever 100, can elevate the push bars 13 to raise the entire implement. A plurality of ground engaging shoes 112 are mounted on the lower frame member 22 and serve to limit the downward swinging movement of the implement.

The implement is counterbalanced by means of helical tension springs 115 attached to mounting plates 116 at opposite sides of the tractor and extending forwardly therefrom. The forward ends of the springs 115 are connected through rods 117 to a pair of arms 118 fixed at opposite ends of a rockshaft 119, respectively. The rockshaft 119 extends across the forward end of the tractor and is carried on a pair of mounting plates 120, which are fixedly secured to the sides of the tractor at the forward end thereof and which extend forwardly therefrom to support the rockshaft. A lifting arm 121 extends forwardly from the center of the rockshaft 119 and is connected through a link 122 to a lug 123 attached to the vertical frame member 25 at the center of the rectangular frame 20. The springs 115 exert a lifting force through the rockshaft 119 and lifting arm 121 to counterbalance the weight of the implement and facilitate adjustment of the latter by means of the hand lever 100.

Power is supplied from the tractor engine for operating the gathering, snapping, and conveying mechanism on the implement, by means of a conventional power take-off shaft 125 extending rearwardly from the axle housing of the tractor. A pair of drive chains 126 are trained over a pair of sprockets 127 on the power take-off shaft 125 and extend laterally in opposite directions and are trained over a pair of sprockets 128 fixed to the rear ends of a pair of forwardly extending power shafts 129, which are journaled in suitable bearings 130 supported on the tractor axle housings 12. Each of the shafts 129 is connected through a universal joint 131 with a telescoping shaft 132, the forward end of which is connected through a universal joint 133 to a longitudinally extending drive shaft 134 journaled in bearings 135 attached to the push bars 13. The forward ends of the drive shafts 134 extend into gear boxes 136 mounted on the implement frame. The snapping rolls 40 are driven through chains 137 which are trained over sprockets 138 mounted on stub shafts 139 extending upwardly from the gear boxes 136, respectively. The two snapping rolls are geared together by means of a pair of intermeshing gears 140 in a manner well-known to those skilled in the art. The drive chain 141 transmits power from a sprocket 142 on one of the snapping roll shafts to a sprocket 143, which is mounted on a common shaft with the lower gatherer chain sprocket 74 and drives the latter. The chain 141 also passes around a sprocket 175 from which the ear conveyor chain 86 is driven. The crankshaft 61 is driven through the chain 66, which is trained over a sprocket 176 on a longitudinally extending shaft 177, the rear end of which carries a sprocket 178 connected through a chain 179 with a sprocket 180 fixed on the drive shaft 134.

Referring now more particularly to Figures 3, 4 and 4A, the four-row harvester is provided with five laterally spaced gatherers 34', the three center ones being symmetrically formed so that they are adapted to lift and straighten the cornstalks in the rows on opposite sides thereof, and defining cornstalk receiving passages 31' which are spaced on approximately 20-inch centers. Several of the parts in this embodiment are similar but not identical to those in the embodiment of Figures 1, 2 and 2A and such parts will be referred to by corresponding reference characters supplemented by the exponent "a". Parts that are peculiar to Figures 3, 4 and 4A will be identified by new reference numerals. Identical parts, such as the frame 20, will bear numerals previously used on those parts. In this embodiment, the upper portions of the gatherers are formed of sheet metal in the form of substantially vertical cylinders 185, the upper ends of which are attached to the upper transverse frame member 21. Two of the gatherers 34', namely, the second and fourth gatherers, are provided with a pair of laterally spaced vertically extending shafts 186, each of which is disposed behind the cylindrical portion 185 and journaled in a bearing 187 at its upper end mounted in a bearing bracket 188, which is fixed to the front side of the upper transverse frame member 21. The lower end of each shaft 186 is journaled in a suitable bearing which is supported on a bracket 189, fixed to the front side of the lower transverse frame member 22. At the lower end of each shaft 186 is fixed a rotary cutter comprising a hub 190 and a plurality of radially extending knives 191, disposed in a substantially horizontal plane. The knives 191 are rotatable through a slot 192 in the side of the sheet metal gatherer 34', the shaft 186 being adapted to rotate in such a direction that each knife blade 191 swings outwardly into the stalk receiving passage 31', and rotates rearwardly through the passage and passes over a ledger plate 193 disposed in the passage 31' and mounted on top of the lower transverse frame member 22. The knife blades 191 and the ledger plate cooperate to sever the stalks therebetween as the implement moves forwardly in the field. Additional stationary knives 194 are positioned alongside the ledger plates 193 and have cutting edges that extend forwardly and also inclined away from the rotary knives 191, and cooperate with the latter in severing the stalks.

At the upper end of each shaft 186 is disposed a second rotary cutter comprising a hub 196 fixed to the shaft 186 and having a plurality of radially outwardly extending cutter blades 197 fixed to the hub 196 and extending outwardly through a slot 198 in the upper end of the cylindrical gatherer portion 185. The blades 197 rotate through the slots 198 and move rearwardly through the upper portion of the stalk passage 31', shearing the stalks against a cooperative ledger plate 199. As best shown in Figure 3, the ledger plates 199 each have a forwardly and outwardly inclined edge 200 adjacent the outer ends of the rotary blades 197, for the purpose of facilitating the cutting of the stalks by the upper rotary blades 197. Thus, during operation, the shafts 186 rotate to cause the upper and lower knife blades 197, 191, to cut the tops from the stalks simultaneously with the severing of the stalks from the ground. Of course, the upper knife blades 197 are positioned at an elevation above the ears on the stalks, so that only the lower portion of the stalk with the ear attached is passed to the snapping rolls 40.

This four-row machine has only the two pairs of snapping rolls 40, one pair being disposed on each side of the front end of the tractor body. Each pair of snapping rolls 40 is adapted to receive the stalks from both rows on that side of the center line of the machine. This is accomplished by providing a stalk passage housing having rearwardly converging side walls 205, 206 extending rearwardly from the frame 20, converging toward the snapping rolls 40 associated therewith (Fig. 4A). A butt pan 47' is attached to the lower edges of the walls 205, 206, and a top wall or roof plate 207 covers the stalk passageway between the walls 205, 206 and the bearing support channel 41.

A pair of gatherer chains 70ª, including sprockets 71ª and shafts 72ª, are mounted on each of the converging walls 205, 206 in vertically spaced relation and travel rearwardly in converging relation along the passage walls to convey the stalks to the snapping rolls, but it will be noted that in each stalk passageway 31' the chains 70ª are on only one wall 34ª thereof. The opposite side 34ᵇ of each passageway 31' is provided with gathering wheels, each of which comprises a hub 210 rigidly fixed to the vertical shaft 186, and having a plurality of outwardly extending curved fingers 211 attached thereto. Each of the vertical shafts 186 is provided with five of the gathering wheels in vertically spaced arrangement, there being slots 212 provided in the cylindrical portions 185 of the gatherers through which the curved fingers 211 move into the stalk passageways 31' as the shafts 186 rotate. Fingers 211 thus rotate in substantially horizontal planes, and the fingers are curved in trailing relation to the direction of rotation so that they are disengaged from the stalks after the latter are passed into the enclosed passageway behind the rectangular frame 20, after which the fingers 75ª on the chains 70ª act against the stalks to present the latter to the snapping rolls 40.

As in the two-row machine, the stalks are moved rearwardly over the butt pans 47', which terminate forwardly of the snapping rolls to provide an opening through which the ears drop to the conveyors 80.

We claim:

1. A corn harvester comprising in combination, a mobile frame, a pair of cooperative snapping rolls journaled on said frame and inclined downwardly and rearwardly to first engage the tops of the stalks, cutting means mounted on the lower portion of said frame ahead of said snapping rolls, and an ear conveyor inclined upwardly and rearwardly from beneath said snapping rolls, said conveyor extending forwardly of the lower ends of the associated rolls to a point substantially beneath the upper ends of the latter.

2. A corn harvester comprising in combination, a mobile frame, a plurality of laterally spaced gatherer units fixed to said frame, two laterally spaced pairs of cooperative snapping rolls journaled on said frame and inclined downwardly and rearwardly to first engage the tops of the stalks, cutting means mounted on the lower portion of said frame ahead of each of said pairs of snapping rolls, and a pair of ear conveyors inclined upwardly and rearwardly from beneath said pairs of rolls, respectively, and substantially perpendicular to the latter, each of said conveyors extending forwardly of the lower ends of the associated snapping rolls to a point substantially beneath the upper ends of the latter, and side and bottom walls mounted on said frame enclosing the space between said rolls and said gatherers and between the conveyors and the cutting means.

3. A corn harvester comprising in combination, a mobile frame, five gatherers rigidly mounted on said frame and disposed in laterally spaced arrangement to provide for gathering four rows of stalks between adjacent gatherers, respectively, cutting means disposed between each of said pairs of adjacent gatherers for severing stalks, two laterally spaced pairs of snapping rolls mounted on said frame, guide walls converging rearwardly and positioned between said gatherers and said rolls to guide severed stalks from two of the rows to each pair of snapping rolls, respectively, and means for moving the cut stalks between the respective guide walls for presenting the stalks to said snapping rolls.

4. A corn harvester comprising in combination, a mobile frame, five gatherers rigidly mounted on said frame and disposed in laterally spaced arrangement to provide for gathering four rows of stalks between adjacent gatherers, respectively, a pair of vertically spaced cutting means disposed between each pair of adjacent gatherers for severing said stalks and for cutting off the tops thereof, respectively, two laterally spaced pairs of snapping rolls mounted on said frame, guide walls converging rearwardly and positioned between said gatherers and said rolls to guide severed stalks from two of the rows to each pair of snapping rolls, respectively, and means for moving the cut stalks between the respective guide walls for presenting the stalks to said snapping rolls.

5. A corn harvester comprising in combination, a mobile frame, five gatherers rigidly mounted on said frame and disposed in laterally spaced arrangement to provide for gathering four rows of stalks between adjacent gatherers, respectively, two laterally spaced pairs of cooperative snapping rolls journaled on said frame and inclined downwardly and rearwardly to first engage the tops of the stalks, cutting means mounted on the lower portion of said frame between each pair of adjacent gatherers, and a pair of ear conveyors inclined upwardly and rearwardly from beneath said pairs of rolls, respectively, each of said conveyors extending forwardly of the lower ends of the associated rolls to a point substantially beneath the upper ends of the latter, said conveyors being disposed substantially perpendicular to said snapping rolls, side walls converging rearwardly and positioned between said gatherers and said rolls to guide severed stalks from two of the rows to each pair of snapping rolls, respectively, and means for moving the cut stalks between the respective side walls for presenting the stalks to said snapping rolls.

6. The combination set forth in claim 5, including the further provision that said cutting means comprises a plurality of rotatable shafts disposed vertically behind said gatherers and having radially extending knives mounted thereon, for severing the stalks in each row and said stalk moving means includes vertically spaced stalk engageable arms mounted on said shafts, said gatherers being slotted to accommodate rotary movement of said knives and said arms from behind said gatherers across the row spaces between the gatherers.

7. A corn harvester for use with a tractor, comprising: a pair of push bars having provision for pivotal attachment to such tractor to extend forwardly along opposite sides of the tractor for vertical swinging movement relative to the tractor; a generally rectangular frame positionable across the front of the tractor in a normally vertical position and fixed to the forward ends of said bars and swingable vertically therewith; bracing members between said bars and said frame, the latter including a pair of upper and lower transversely disposed supporting members; a plurality of gatherers mounted on said transverse members; stalk-cutting means mounted on one of said members; a pair of snapping roll units spaced laterally apart to lie respectively at opposite sides of the tractor and journaled at their upper ends in bearing means mounted on said upper frame member and extending downwardly and rearwardly behind said rectangular frame; bearing means mounted on said push bars for supporting the lower ends of said snapping roll units; guides behind said snapping rolls for discharging stalks outwardly and laterally therefrom; and ear conveyors extending upwardly and rearwardly from beneath the snapping roll units for disposition respectively along opposite sides of the tractor.

8. A corn harvester for use with a tractor, comprising: a pair of push bars having provision for pivotal attachment to such tractor to extend forwardly along opposite sides of the tractor for vertical swinging movement relative to the tractor; a generally rectangular frame positionable across the front of the tractor in a normally vertical position and fixed to the forward ends of said bars and swingable vertically therewith; bracing members between said bars and said frame, the latter including a pair of upper and lower transversely disposed supporting members; a plurality of gatherers mounted on said transverse members; stalk-cutting means mounted on one of said members; a pair of snapping roll units spaced apart laterally to lie respectively at opposite sides of the tractor and journaled at their upper ends in bearing means mounted on said upper frame member and extending downwardly and rearwardly behind said rectangular frame; bearing means mounted on said push bars for supporting the lower ends of said snapping roll units; a pair of laterally spaced walls extending forwardly from each snapping roll unit to the gatherers associated therewith; and gatherer means movable over said walls for moving cut stalks from said cutting means through said rectangular frame and presenting them to said snapping roll units.

9. A corn harvester for use with a tractor, comprising: a pair of push bars having provision for pivotal attachment to the tractor to extend forwardly along opposite sides of the tractor for vertical swinging relative to the tractor; a generally rectangular frame positionable across the front of the tractor in a normally vertical position and fixed to the forward ends of said bars and swingable vertically therewith; bracing members between said bars and said frame, the latter including a pair of upper and lower transversely disposed supporting members; five gatherers mounted on said transverse members, and disposed in laterally spaced arrangement to provide for gathering four rows of stalks between each of said pairs of adjacent gatherers; two pairs of snapping rolls on the frame arranged to lie one pair at each side of the tractor and journaled at their upper ends in bearing means mounted on said upper frame member and extending downwardly and rearwardly behind said rectangular frame;

bearing means mounted on said push bars for supporting the lower ends of said snapping rolls; guide walls converging rearwardly from said rectangular frame for guiding stalks from two of the rows to one pair of snapping rolls and for guiding stalks from two other rows to the other pair of snapping rolls; and gatherer means movable over said walls for moving the cut stalks rearwardly through said frame and presenting them to said snapping rolls.

10. A corn harvester for use with a tractor, comprising: a pair of push bars having provision for pivotal attachment to the tractor to extend forwardly along opposite sides of the tractor for vertical movement relative to the tractor; a generally rectangular frame positionable across the front of the tractor in a normally vertical position and fixed to the forward ends of said bars and swingable vertically therewith; bracing members between said bars and said frame, the latter including a pair of upper and lower transversely disposed supporting members; a plurality of gatherers mounted on said transverse frame members; cutting members mounted on said upper and lower frame members for severing stalks; a pair of snapping roll units spaced apart laterally to lie respectively at each side of the tractor and journaled at their upper ends in bearing means mounted on said upper frame member and extending downwardly and rearwardly behind said rectangular frame; bearing means mounted on said push bars for supporting the lower ends of said snapping roll units, a pair of laterally spaced walls extending forwardly from each snapping roll unit to the gatherers associated therewith; and gatherer means movable over said walls for moving cut stalks from said cutting means through said rectangular frame and presenting them to said snapping roll units.

11. A corn harvester for use with a tractor, comprising: a pair of push bars having provision for pivotal attachment to the tractor to extend forwardly along opposite sides of the tractor for vertical movement relative to the tractor; a generally rectangular frame positionable across the front of the tractor in a normally vertical position and fixed to the forward ends of said bars and swingable vertically therewith; bracing members between said bars and said frame, the latter including a pair of upper and lower transversely disposed supporting members, a plurality of gatherers mounted on said transverse frame members and extending forwardly therefrom; a rotatable shaft disposed vertically between each pair of adjacent cooperable gatherers and journaled on said upper and lower frame members; rotary knives mounted on each shaft adjacent the upper and lower ends thereof, respectively; cutter bars fixed to said upper and lower members and adapted to cooperate with said knives for severing the stalks from the ground and for cutting the tops from the stalks, respectively; snapping rolls disposed behind said rectangular frame and journaled thereon; and means for moving the cut stalks rearwardly through said frame and presenting them to said snapping rolls.

LOUIS A. PARADISE.
WILBUR J. COULTAS.
NORMAN F. ANDREWS.

REFERENCES CITED

The following references are of record in the file of this patent:

UNITED STATES PATENTS

| Number | Name | Date |
|---|---|---|
| 521,679 | Stone | June 19, 1894 |
| 872,285 | Hollenbeck | Nov. 26, 1907 |
| 966,029 | Lichty | Aug. 2, 1910 |
| 1,943,284 | Binau | Jan. 16, 1934 |
| 2,346,963 | Hague | Apr. 18, 1944 |